United States Patent [19]

Allen et al.

[11] Patent Number: 5,692,218
[45] Date of Patent: *Nov. 25, 1997

[54] SYSTEM FOR TRANSFERRING DATA BETWEEN INPUT/OUTPUT DEVICES HAVING SEPARATE ADDRESS SPACES IN ACCORDANCE WITH INITIALIZING INFORMATION IN ADDRESS PACKAGES

[75] Inventors: Michael Scott Allen; Michael Julio Garcia; Charles Roberts Moore; Robert James Reese, all of Austin, Tex.

[73] Assignees: International Business Machines Corporation, Armonk, N.Y.; Motorola, Inc., Schaumburg, Ill.

[*] Notice: The term of this patent shall not extend beyond the expiration date of Pat. No. 5,603,057.

[21] Appl. No.: 639,274

[22] Filed: Apr. 25, 1996

Related U.S. Application Data

[63] Continuation of Ser. No. 10,901, Jan. 29, 1993, abandoned.

[51] Int. Cl.$^6$ ............................................. G06F 13/00
[52] U.S. Cl. .................... 395/853; 395/823; 395/824; 395/854
[58] Field of Search .................... 395/853, 823, 395/824, 854; 364/240, 228, 229, 926

[56] References Cited

U.S. PATENT DOCUMENTS

| | | | |
|---|---|---|---|
| 4,543,626 | 9/1985 | Bean et al. | 364/200 |
| 4,631,671 | 12/1986 | Kawashita et al. | 395/425 |
| 4,851,990 | 7/1989 | Johnson et al. | 364/200 |
| 4,872,110 | 10/1989 | Smith et al. | 395/275 |
| 4,901,232 | 2/1990 | Harrington et al. | 395/275 |
| 4,930,070 | 5/1990 | Yonekura et al. | 364/200 |
| 5,237,567 | 8/1993 | Nay et al. | 370/85.1 |
| 5,379,396 | 1/1995 | Gochman, et al. | 395/425 |
| 5,388,231 | 2/1995 | Starr | 395/325 |
| 5,603,057 | 2/1997 | Allen et al. | 395/853 |

FOREIGN PATENT DOCUMENTS

| | | | |
|---|---|---|---|
| 0 138 676 | 4/1985 | European Pat. Off. | |
| WO84/04831 | 12/1984 | WIPO | |
| WO90/04698 | 3/1991 | WIPO | G06F 13/42 |
| WO91/03786 | 3/1991 | WIPO | |

*Primary Examiner*—Thomas C. Lee
*Assistant Examiner*—Le Hien Luu
*Attorney, Agent, or Firm*—Michael A. Davis; Duke W. Yee; Andrew J. Dillon

[57] ABSTRACT

A method and system in a data processing system for transferring data from a first device to a second device within the data processing system. The data processing system includes a data bus, an address bus, a first address space associated with a memory and a second address space associated with an input/output device. Initially, an operation request package is transmitted to a second device from a first device, which informs the second device of the total amount of data to be transferred. A transfer signal is then transmitted in the data processing system. The transfer signal identifies the transfer as a transfer concerning an address in the second address space associated with the input/output device. A first address package is then transmitted to the second device from the first device on the address bus. The first address package includes a transfer identifier, a first identifier associated with the first device and a second identifier associated with the second device. A second address package, comprising a byte count and an address, are transmitted to the second device from the first device on the address bus. If data is to be transferred, the data is then transferred on the data bus. Finally, a reply signal may be transmitted between the first and second devices, acknowledging the success or failure of the data transfer.

20 Claims, 6 Drawing Sheets

SYSTEM FOR TRANSFERRING DATA BETWEEN INPUT/OUTPUT DEVICES HAVING SEPARATE ADDRESS SPACES IN ACCORDANCE WITH INITIALIZING INFORMATION IN ADDRESS PACKAGES

This is a continuation of division of application Ser. No. 08/010,901, filed 29 Jan. 1993, now abandoned.

BACKGROUND OF THE INVENTION

1. Technical Field

The present invention relates in general to data processing systems, and in particular to a method and system for data transfer within a data processing system. Still more particularly, the present invention relates to a method and system to utilize a request operation for enhanced data transfer in a data processing system.

2. Description of the Related Art

Designers of modern state-of-the-art data processing systems are continually attempting to enhance the performance aspects of such systems. One technique for enhancing data processing system efficiency is the utilization of separate memory and input/output (I/O) addresses. Furthermore, it is common to use separate buses for memory and I/O transactions.

Separate buses, however, are expensive to implement due to the need for increased pin outs for the separate buses. Therefore, it is desirable to perform both memory and I/O transfers on a single bus. Using a single bus for both memory and I/O transfers, however, increases the complexity of the system because memory and I/O transactions are very different. I/O transfers must provide synchronous error detection and strict ordering. Strict ordering means the transfers must run on the address bus in the order of the instruction stream. One consequence of strict ordering is that I/O transfers may reduce the performance potential of a system because latency for I/O transfers typically is much larger than the latency for memory transfers. Latency for I/O transfers are larger because accessing I/O devices usually takes longer. Latency refers to the time interval between the instant at which an instruction control unit initiates a call for data and the instant at which the actual transfer of the data starts.

Another technique utilized for enhancing data processing system efficiency is memory mapping. Memory mapping requires that I/O addresses be decoded before the I/O transfer can occur. Typically, this factor limits I/O addresses to 32 bits. Another disadvantage to memory mapping is that it requires a synchronization instruction be given for each I/O transfer. Finally, memory mapping typically does not provide for error reporting when there is a problem with an I/O device during a transfer.

Therefore, a need exists for a method and system of enhanced data transfer in a data processing system which utilizes a single bus interface for both memory and I/O transfers. It is also desirable that such a method and system maintain strict ordered accesses and error detection.

SUMMARY OF THE INVENTION

It is therefore one object of the present invention to provide a method and system for enhanced data transfer in a data processing system.

It is another object of the present invention to provide a method and system for enhanced data transfer in a multiprocessor data processing system.

It is yet another object of the present invention to decrease the complexity in performing memory I/O address transfers in a data processing system.

The foregoing objects are achieved as is now described. A method and system in a data processing system is provided for transferring data from a first device to a second device within the data processing system, where the data processing system includes a data bus, an address bus, a first address space associated with a memory and a second address space associated with an input/output device. Initially, an operation request package is transmitted to a second device from a first device, which informs the second device of the total amount of data to be transferred. A transfer signal is then transmitted within the data processing system. The transfer signal identifies the transfer as a transfer concerning an address in the second address space associated with the input/output device. A first address package is then transmitted to the second device from the first device on the address bus. The first address package includes an operation identifier, a first identifier associated with the first device and a second identifier associated with the second device. A second address package, comprising a byte count and an address, are transmitted to the second device from the first device on the address bus. If data is to be transferred, the data is then transferred on the data bus. Finally, a reply signal may be transmitted between the first and second devices, acknowledging the success or failure of the data transfer.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
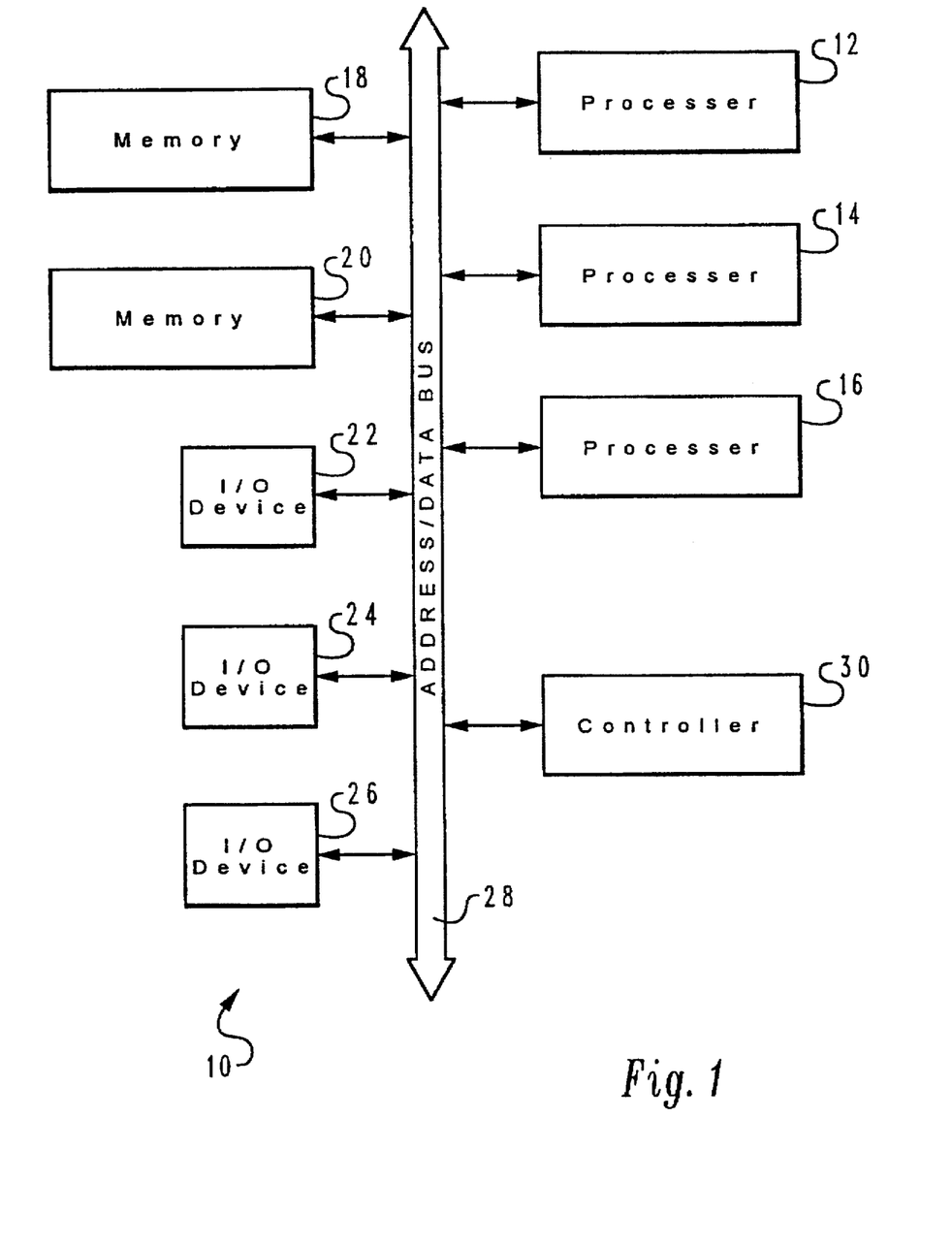
FIG. 1 is a high level block diagram illustrating a data processing system which may be utilized to implement the method and system of the present invention.

With reference to the figures and in particular with reference to FIG. 1, a high level block diagram illustrating a data processing system 10 which may be utilized to implement the method and system of the present invention is depicted. Data processing system 10 includes processors 12, 14, 16 connected to memories 18, 20 and input/output (I/O) devices 22, 24, 26 via bus 28. In the preferred embodiment, processors 12, 14, 16 may read from and write to memories 18, 20, as well as transmit to and receive data from I/O devices 22, 24, 26. Controller 30 controls the transactions between processors 12, 14, 16, memories 18, 20 and I/O devices 22, 24, 26.

Data processing system 10 is preferably configured to define separate memory and I/O address spaces. An example of the bus architecture which may be implemented in the preferred embodiment is described in the manual for the MC88110 reduced instruction set computer (RISC) microprocessor, entitled *Second Generation RISC Microprocessor User's Manual*, Motorola, copyright 1991. The separate address spaces are distinguished in the preferred embodiment by a bit in the address translation logic. If the bit is not set, then the memory reference is a memory address transfer, which, in the preferred embodiment, utilizes a virtual memory management system. If the bit is set, the memory reference is an I/O memory address transfer.

Data processing system 10 is also preferably constructed with a single bus interface to support both memory and I/O memory address transfers. In the preferred embodiment, the I/O memory address transfers are strictly ordered, meaning the transfers must run on the address bus in the order of the instruction stream. Furthermore, data processing system 10 preferably has synchronous error reporting capability for I/O memory address transfers. Because one instruction is executed completely before the next instruction is encountered in the preferred embodiment, determining when and where an error occurs is synchronized with the I/O memory address transfer.

Figure 2:
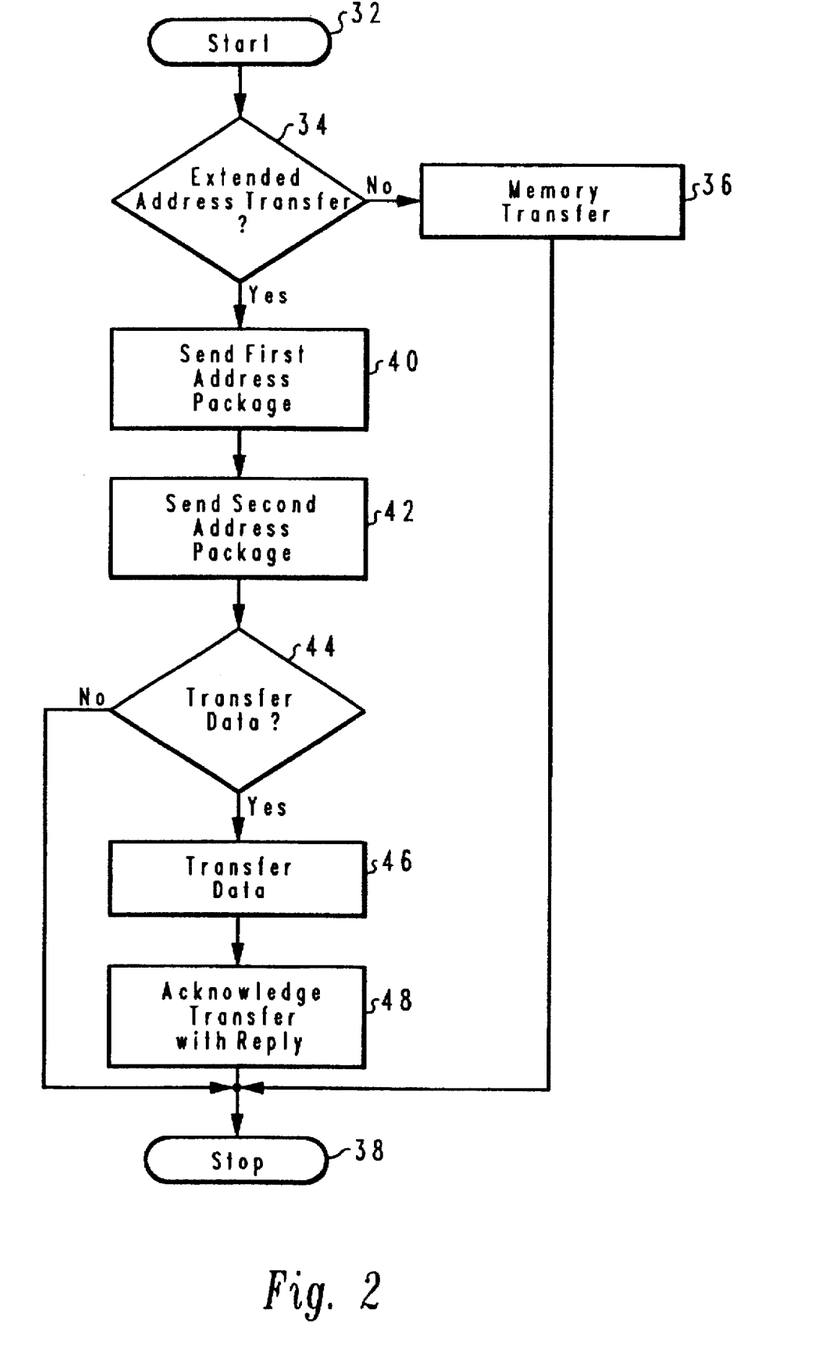
FIG. 2 is a high level logic flow chart depicting a process for transferring data according to the present invention.

FIG. 2 is a high level logic flow chart depicting a process for transferring data according to the present invention. The process begins at block 32, and thereafter passes to block 34. Block 34 illustrates a determination of whether or not a transaction involves an extended address transfer. An extended address transfer is one in which involves an I/O transfer. Data processing system 10 determines from the type of signal that is asserted whether a transfer involves a memory or an I/O address. One advantage to utilizing two different signals for the different address transfers is that all memory mapped devices may ignore the I/O transfers.

If the transfer is not an extended address transfer, the process passes to block 36, which depicts a memory address transfer. The process then ends, as shown in block 38. If the transfer is an extended address transfer, the process passes to block 40. Block 40 illustrates the sending of a first address package, and block 42 depicts the sending of a second address package. In the preferred embodiment, the address bus is "double pumped" for I/O address transfers, meaning two segments of information are placed on the address bus for I/O address transfers. The first segment, or address package, includes an operation identifier, an identifier associated with the sender of the data, and an identifier associated with the receiver of the data. The second address package includes a total byte count for the data to be transferred and the address for the transfer.

In the preferred embodiment, there are seven transfer operations. These transfer operations are listed below.

| Operation | Type of Transfer |
| --- | --- |
| Load Start (Request) | Address Only |
| Load Immediate | Address and Data |
| Load Last | Address and Data |
| Store Immediate | Address and Data |
| Store Last | Address and Data |
| Load Reply | Address Only |
| Store Reply | Address Only |

Store Immediate and Store Last operations transfer preferably up to 32 bits of data each transaction. Store Reply is utilized to acknowledge the success or failure of the data transfer. In the preferred embodiment, a store access is comprised of one or more data transfer operations followed by a store reply operation. If the data may be transferred in one data transaction, the operation is a Store Last operation followed by the Store Reply operation. If the data must be transferred in more than one data transaction, one or more Store Immediate operations occur before the Store Last operation.

A Load Start (Request) operation is utilized in the preferred embodiment to announce the total number of bytes of data that must be provided on subsequent Load Immediate or Load Last operations. If the data may be transferred in one data transaction, the operation is a Load Last operation followed by the Load Reply operation. If the data must be transferred in more than one data transaction, one or more Load Immediate operations occur before the Load Last operation.

The number of transfer operations, however, may vary depending upon the needs of a particular user. For example, a user may want to implement a Store Start (Request) operation to inform a controller or receiver of data of the total number of bytes of data which will be provided by subsequent Store operations.

Still referring to FIG. 2, the process continues at block 44. Block 44 illustrates a determination of whether or not data is to be transferred after the I/O address transfer. As discussed above, data is transferred for Load Immediate, Load Last, Store Immediate, and Store Last operations. If data is not to be transferred, the process ends at block 38. If data is to be transferred, the data is then transferred as shown in block 46. Block 48 depicts the acknowledgement of the transfer of data with the sending of a reply, such as a Store Reply or Load Reply operation. The process then ends at block 38.

Figure 3:
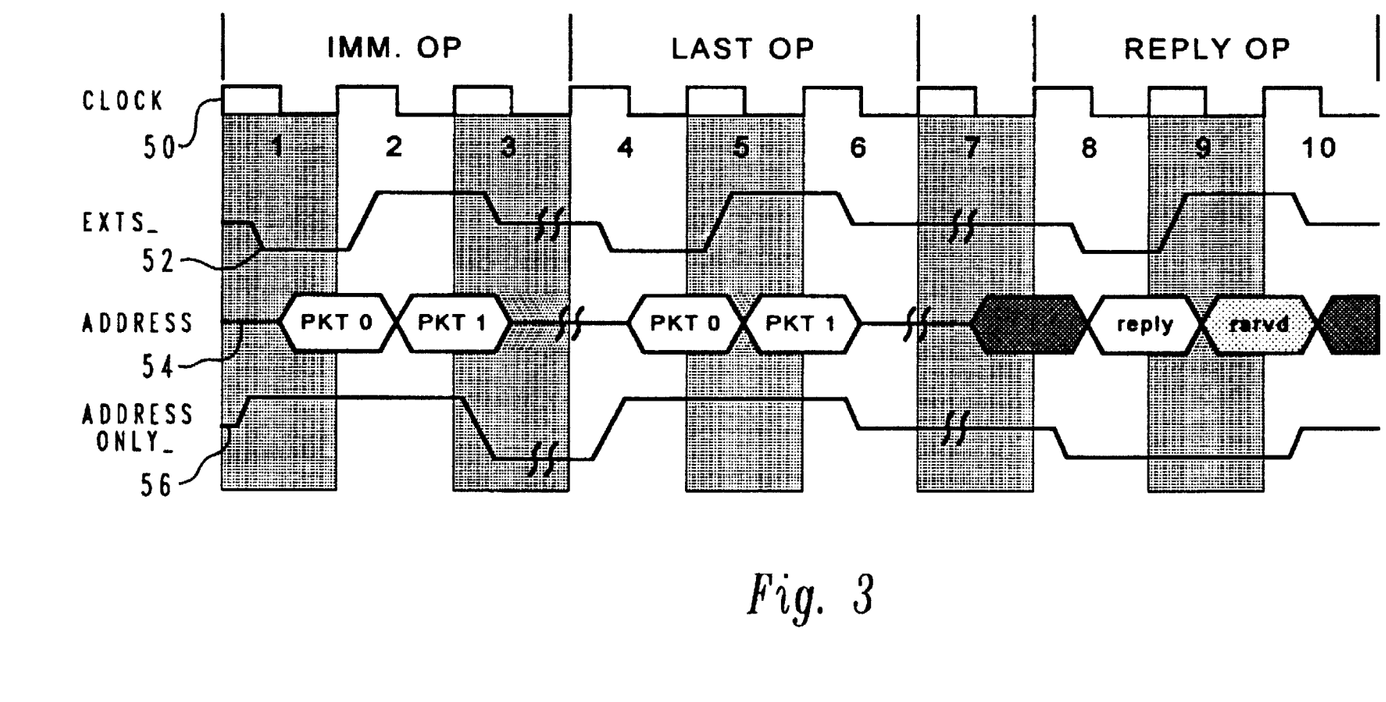
FIG. 3 is a timing diagram illustrating a sequence of events for a portion of the method and system for transferring data according to the present invention.

FIG. 3 is a timing diagram illustrating a sequence of events for a portion of the method and system for transferring data according to the present invention. FIG. 3 depicts a sequence of events for Store operations in the preferred embodiment where two data transactions are required to transfer the data. Signal 50 represents a synchronous clock utilized in the preferred embodiment. Signal 52, labelled EXTS, represents the extended transfer signal which is associated with an I/O transfer. EXTS is recognized by data processing system 10 and alerts data processing system 10 that the address transfer is an I/O address transfer. The first and second address packages for I/O address transfers are then transferred on the address bus, as shown on line 54, labelled ADDRESS.

Since two data transactions are required in this example, the I/O address transfer during bus cycles 1–3 are illustrated for a Store Immediate operation. Signal 56, labelled ADDRESS ONLY, is utilized to indicate when an operation is an address only operation. Consequently, since data is transferred on the data bus during an Store Immediate operation, signal 56 is not asserted in the preferred embodiment.

Some time after the Store Immediate operation, the Store Last operation is performed. In FIG. 3, this is illustrated as happening during bus cycles 4-6. The first and second address packages are transferred on the data bus, as shown in line 54. Again, since a Store Last operation requires data to be transferred on the data bus, signal 56 is not asserted in the preferred embodiment. Finally, the Store Reply operation, shown occurring in bus cycles 8-10, is an address only transfer. Consequently, signal 56 is asserted during those bus cycles. As discussed above, signal 56 is utilized to indicate a transfer is an address only transfer.

Figure 4:
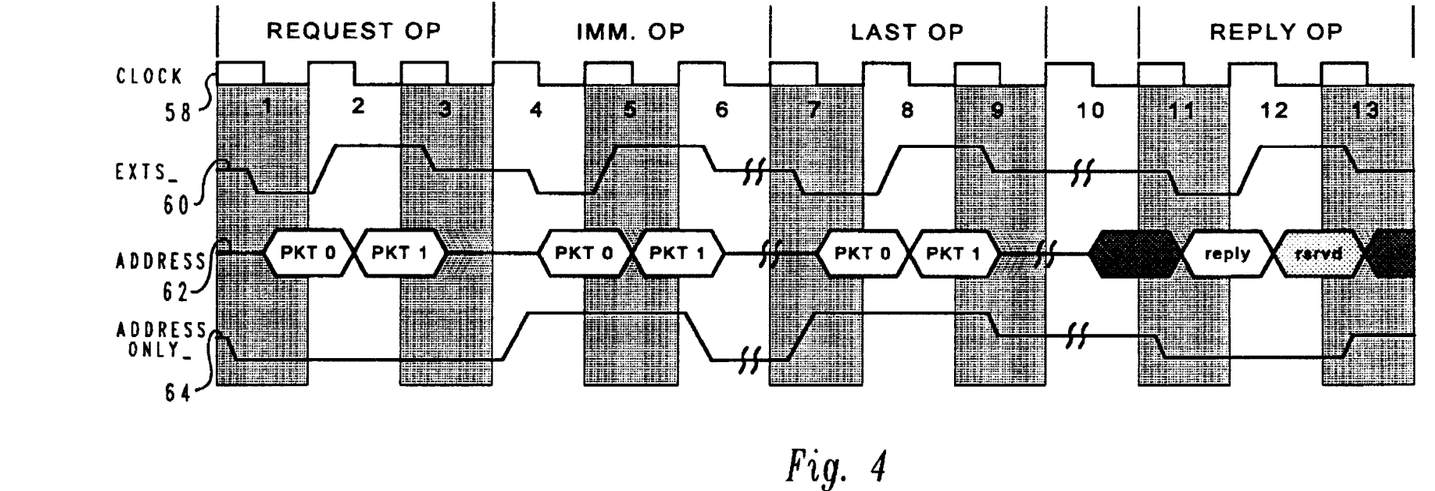
FIG. 4 is a timing diagram depicting a sequence of events for a portion of the method and system for transferring data according to the present invention.

Referring to FIG. 4, a timing diagram illustrating a sequence of events for a portion of the method and system for transferring data according to the present invention is depicted. FIG. 4 illustrates a sequence of events for Load operations in the preferred embodiment where two data transactions are required to transfer the data. Signals 58, 60, 64 and line 62 are the same signals or events as described with reference to FIG. 3.

The first Load operation performed in this example is a Load Start (Request) operation. Since a Load Start operation is an address only operation, signal 64 is asserted. An operation request package for the Load Start operation are transferred on the address bus, as shown on line 62. In the preferred embodiment, the operation request package contains a first and a second address package. For this address only transfer, the total number of bytes of data to be read in subsequent Load Immediate or Load Last operations is included, thereby informing the I/O device of the total amount of data needed for the transfer.

As with the example described with reference to FIG. 3, two data transactions are required, so the first and second address packages transferred during bus cycles 4-6 are illustrated on line 62 for a Load Immediate operation. Since data is transferred on the data bus during a Load Immediate operation, signal 64 is not asserted in the preferred embodiment. Some time after the Load Immediate operation, the Load Last operation is performed. In FIG. 4, this is illustrated as happening during bus cycles 7-9. The first and second address packages are transferred on the address bus, as shown on line 62. Again, since a Load Last operation requires data to be transferred on the data bus, signal 64 is not asserted in the preferred embodiment. Finally, the Load Reply operation, shown occurring in bus cycles 10-13, is an address only transfer. Consequently, signal 64 is asserted during those bus cycles.

Figure 5:
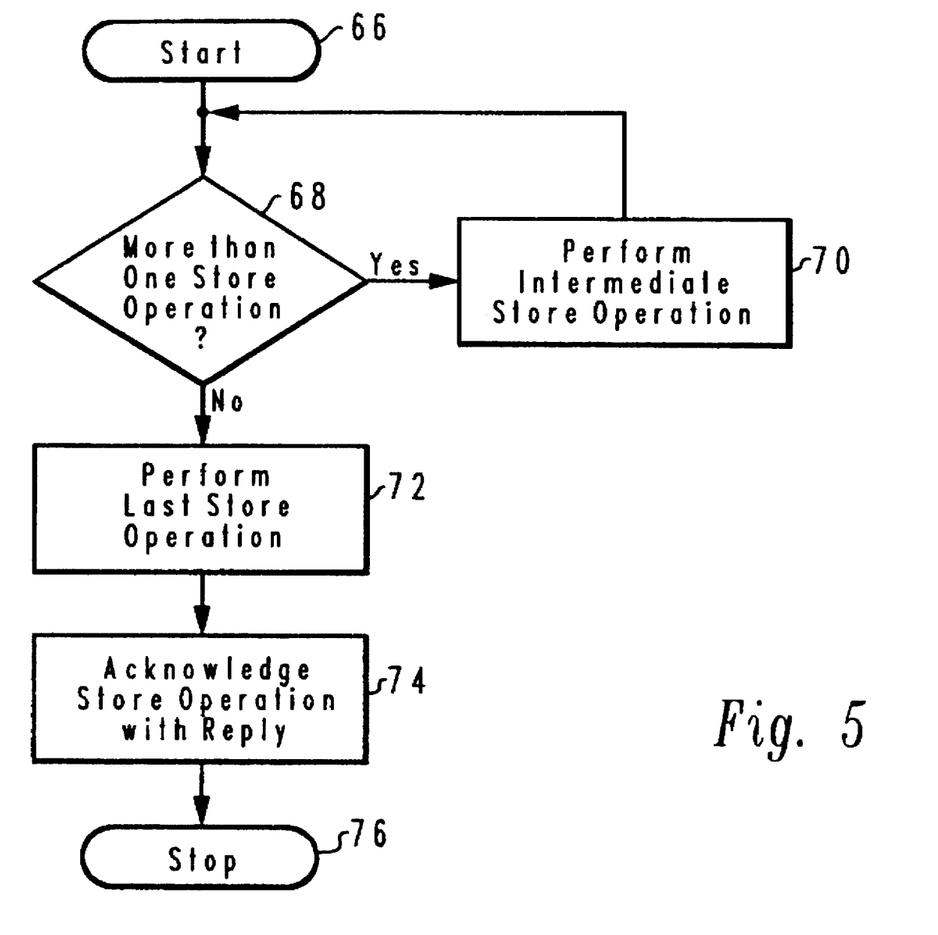
FIG. 5 is a high level logic flow chart illustrating a process for transferring data according to the present invention.

FIG. 5 is a high level logic flow chart illustrating a process for transferring data according to the present invention. FIG. 5 is an example of the process associated with Store operations in the preferred embodiment. The process begins with block 66, and then passes to block 68. Block 68 depicts a determination of whether or not more than one Store operation is necessary to transfer the data. If more than one Store operation is required, the process continues at block 70, showing the performance of a Store Immediate operation. Thereafter, the process loops back to block 68. If only one Store operation is required, a Store Last operation is performed, as shown in block 72. Following the Store Last operation, a Store Reply operation occurs. This operation is illustrated in block 74. Finally, the process ends at block 76.

Figure 6:
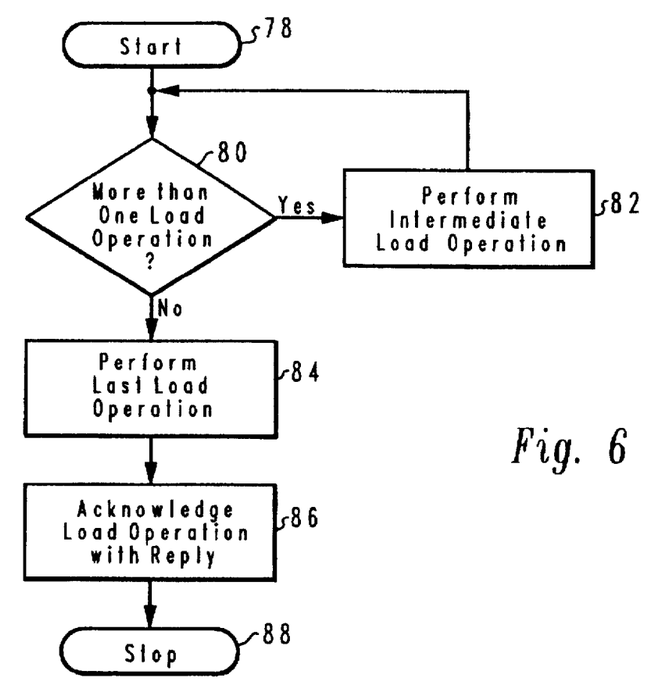
FIG. 6 is a high level logic flow chart depicting a process for transferring data according to the present invention.

Referring to FIG. 6, a high level logic flow chart depicting a process for transferring data according to the present invention. FIG. 6 is an example of the process associated with Load operations in the preferred embodiment. The process begins with block 78, and then passes to block 80. Block 80 illustrates a determination of whether or not more than one Load operation is necessary to transfer the data. If more than one Load operation is required, the process continues at block 82, showing the performance of a Load Immediate operation. Thereafter, the process loops back to block 80. If only one Load operation is required to transfer the data, a Load Last operation is performed, as shown in block 84. Following the Load Last operation, a Load Reply operation occurs. This operation is depicted in block 86. Finally, the process ends at block 88.

Figure 7:
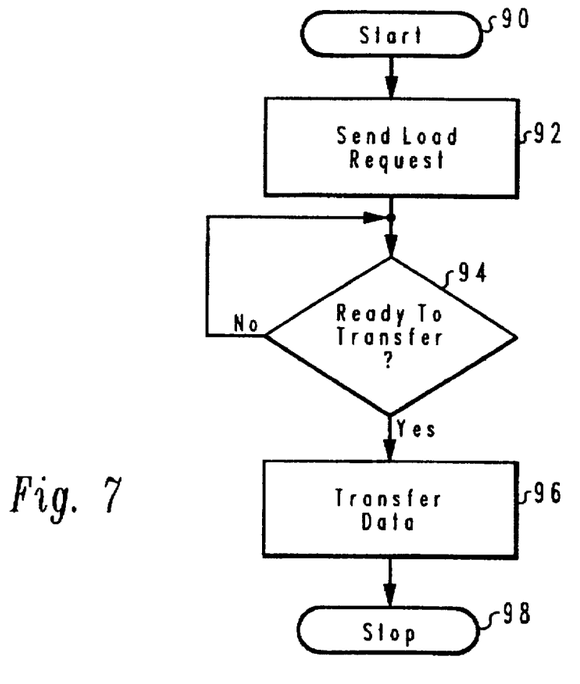
FIG. 7 is a high level logic flow chart illustrating a process for transferring data according to the present invention.

FIG. 7 is a high level logic flow chart illustrating a process for transferring data according to the present invention. FIG. 7 is an example of the process associated with a Load Start (Request) operation. In the preferred embodiment, the process depicted in FIG. 7 is performed prior to the step illustrated in block 80 in FIG. 6.

The process begins at block 90, and thereafter passes to block 92. Block 92 depicts sending a Load Start (Request) command to a controller or I/O device. In the preferred embodiment, the Load Start (Request) command is used to alert a controller or I/O device of the total number of bytes of data that must be provided on subsequent Load Immediate or Load Last operations. The process then continues at block 94, with a determination of whether or not the data is ready to be transferred. If the data is not ready to be transferred, the process loops back to block 94. If the data is ready to be transferred, the process passes to block 96, which illustrates transferring the data. Finally, the process ends at block 98.

Upon reference to the foregoing, those skilled in the art will appreciate that a method and system to utilize a request operation for enhanced data transfer in a data processing system is disclosed. Some of the advantages of the method and system of the present invention include error detection for I/O transfers, strictly ordered accesses, a single bus interface for both memory and I/O transfers, and split address and data transactions for I/O transfers allowing other transactions on the system bus during I/O operations.

While the invention has been particularly shown and described with reference to a preferred embodiment, it will be understood by those skilled in the art that various changes in form and detail may be made therein without departing from the spirit and scope of the invention.

What is claimed is:

1. A method in a data processing system for transferring information between a first device and a second device, said first and second devices having a first and second separate address spaces, respectively, and said data processing system having a system bus which includes an address bus and data bus, comprising:

transmitting a transfer information signal from said first device to identify information to be transferred with respect to an address in said second address space, said transfer information signal having a first address package containing a first identifier associated with said first device and a second identifier associated with said second device, and a second address package containing a value representing the amount of information to be transferred and an address for the information to be transferred;

transferring data between said first device and said second device on said data bus in accordance with information in said address package; and     transmitting a reply signal acknowledging the data transmission on said address bus in response to said transferred data.

2. The method for transferring information between the first device and the second device of claim 1, wherein said reply signal includes an error signal.

3. The method for transferring information between the first device and the second device of claim 1, wherein said step of transmitting reply signal comprises transmitting said reply signal on said address bus.

4. The method for transferring information between the first device and the second device of claim 1, wherein said step of transmitting the transfer information signal identifying said information to be transferred further includes transmitting a second address package to said second device from said first device on said address bus, wherein said second address package includes an address.

5. The method for transferring information between the first device and the second device of claim 4, wherein said step of transferring said information between said first device and said second device, comprises transferring said information between said first device and said second device, wherein said second device is located on said data bus.

6. The method for transferring information between the first device and the second device of claim 4, wherein said second address package further includes a byte count for the information to be transferred.

7. The method for transferring information between the first device and the second device of claim 1, wherein said step of transferring the information between said first device and said second device on said data bus comprises transferring the information from said first device to said second device on said data bus.

8. The method for transferring information between the first device and the second device of claim 1, wherein said step of transferring the information between said first device and said second device on said data bus comprises transferring the information from said second device to said first device on said data bus.

9. The method for transferring information between the first device and the second device of claim 1, wherein said step of transmitting the transfer information signal identifying said information to be transferred includes transmitting a first address package to said second device from said first device on said address bus, wherein said first address package includes an operation identifier.

10. A data processing system for transferring information between a first device and a second device, said first and second devices having a first and second separate address spaces, respectively, comprising:

a system bus having an address bus and a data bus;

means for transmitting a transfer information signal from said first device to identify information to be transferred with respect to an address in said second address space, said transfer information signal having a first address package containing a first identifier associated with said first device and a second identifier associated with said second device, and a second address package containing a value representing the amount of information to be transferred and an address for the information to be transferred;

means for transferring data between said first device and said second device on said data bus in accordance with information in said address package; and means responsive to said transferred data for transmitting a reply signal acknowledging the data transmission on said address bus.

11. The data processing system for transferring information between the first device and the second device of claim 10, wherein said reply signal includes an error signal.

12. The data processing system for transferring information between the first device and the second device of claim 10, wherein said means for transmitting the reply signal comprises means for transmitting said reply signal on said address bus.

13. The data processing system for transferring information between the first device and the second device of claim 10, wherein said reply signal further includes a first identifier associated with said first device and a second identifier associated with said second device.

14. The data processing system for transferring information between the first device and the second device of claim 10, wherein means for transmitting the transfer information signal identifying said information to be transferred means includes means for transmitting a first address package to said second device from said first device on said address bus, wherein said first address package includes an operation identifier.

15. The data processing system for transferring information between the first device and the second device of claim 14, wherein said means for transmitting a transfer information signal identifying said information to be transferred further includes means for transmitting a second address package to said second device from said first device on said address bus, wherein said second address package includes an address.

16. The data processing system for transferring information between the first device and the second device of claim 15, wherein said second address package further includes a byte count for the information to be transferred.

17. The data processing system for transferring information between the first device and the second device of claim 16, wherein said means for transferring the information between said first device and said second device on said data bus comprises means for transferring the information from said first device to said second device on said data bus.

18. The data processing system for transferring information between the first device and the second device of claim 10, wherein said means for transferring the information between said first device and said second device on said data bus comprises means for transferring the information from said second device to said first device on said data bus.

19. The data processing system for transferring information between the first device and the second device of claim 10, wherein said means for transmitting the operation request package to said second device from said first device on said address bus comprises means for transmitting said operation request package only on said address bus without transmitting data on said data bus.

20. The data processing system for transferring information between the first device and the second device of claim 10, wherein said second device is located on said data bus.

* * * * *